Patented Sept. 8, 1936

2,053,527

UNITED STATES PATENT OFFICE 2,053,527

HYDROLYSIS OF CELLULOSE ESTERS CONTAINING HIGHER FATTY ACID GROUPS

Carl J. Malm, Rochester, N. Y., and Charles L. Fletcher, Kingsport, Tenn., assignors to Eastman Kodak Company, Rochester, N. Y., a corporation of New York No Drawing. Application December 28, 1935, Serial No. 56,534

4 Claims. (Cl. 260—102)

This invention relates to the hydrolysis of mixed organic acid esters of cellulose containing at least 25% of fatty acid groups containing 16 or more carbon atoms. The present application is a continuation in part of our co-pending application Serial No. 551,546, filed July 17, 1931, Patent 2,026,583.

The hydrolysis of cellulose acetate is well-known as a method for increasing the solubility of that ester. Esters containing higher fatty acid groups such as cellulose acetate stearate have a wide range of solubility in organic solvents so that there is no necessity of hydrolysis of those esters merely for the purpose of changing their solubility. Nevertheless, we have found several advantages in the hydrolysis of esters of this nature. Among these advantages are improvements in the molding properties of the esters, their increased compatibility with gums and resins and with certain plasticizers. Another distinct feature is that mixed esters of this nature can be hydrolyzed to give a large proportion of unesterified hydroxyl groups and at the same time maintain a relatively high moisture resistance.

Some of the esters which are adapted for use in our process are cellulose acetate stearate, cellulose acetate palmitate, cellulose acetate margarate or esters containing a mixture of higher fatty acid groups. For instance commercial stearic acid is a mixture of palmitic and stearic acids, and the ester prepared by the use of this commercial stearic acid may be a cellulose acetate palmitate stearate. Also other lower acyl groups such as propionyl and butyryl might be present either with the acetyl or as the sole lower acyl groups.

The hydrolysis, in accordance with our invention, may be carried out either upon the cellulose ester dissolved in its reaction mixture or in solution in an acid or other solvent. The conditions employed in the hydrolysis depend upon various factors such as the solvent in which the hydrolysis is to be carried out. For instance, when acetic acid is employed as the solvent, it is desirable to have not more than 5% water present and to use an elevated temperature such as 90–100° C., the elevated temperature being necessary to dissolve the ester. However, with some solvents such as methyl cellosolve acetate or an oxy acid such as methoxy acetic acid, 5 to 10% of water may be employed with or without an elevated temperature. In the case where an elevated temperature is employed, such as above 50° C., it is preferable to hydrolyze in the absence of a mineral acid catalyst, although a catalyst such as sulfuric acid, may be employed at temperatures up to 50 C. The following examples illustrate processes embodying our invention:

Example I

A solution of 10 parts of cellulose acetate stearate, in a mixture of 95 parts of acetic acid, and 5 parts of water, was heated on a steam bath and samples were precipitated at various periods of the hydrolysis as recorded in the following table:

| Hydrolysis | Acetyl | Stearyl | Solubility | | | |
|---|---|---|---|---|---|---|
| | | | Acetone | Ethylene chloride | Propylene chloride | Butyl acetate |
| Hours | Percent | Percent | | | | |
| No. | 27.5 | 34.6 | + | + | + | + |
| 18 | 25.4 | 34.5 | + | + | + | + |
| 48 | 23.8 | 33.1 | + | + | + | + |
| 72 | 23.7 | 31.3 | + | + | Swells | Swells |
| 96 | 23.2 | 30.5 | + | Grainy | Swells | Swells |
| 120 | 22.7 | 28.6 | + | Swells | Swells | -------- |

In the above table a + sign under solubility indicates that the product is soluble in the solvent. The cellulose acetate stearate was insoluble at ordinary temperatures in the 95% acetic acid but upon heating on a steam bath gave a homogeneous solution. For this reason hydrolysis in aqueous acetic acid in the present invention is only feasible at elevated temperatures.

Example II 50 parts of cellulose acetate having an acetyl content of 38% was dissolved in a mixture of 250 parts of beta-methoxyethyl acetate and 100 parts of methoxyacetic anhydride. The solution was heated to 70° C. and 2½ parts of benzene sulfonic acid and 50 parts of stearic acid was added thereto. The mixture was maintained at 70° C. with stirring for six hours after which time a precipitated sample was found to be soluble in hot toluene. The mixture was then cooled to 45° C. and a mixture of 180 parts of beta-methoxyethyl acetate, 33 parts of water and one part, by volume, of sulfuric acid was added thereto. The resulting hydrolysis mixture was held at 45° C. for four days after which time it was precipitated and extracted with methyl alcohol to remove uncombined stearic acid. The dried product was soluble in acetone but insoluble in ethylene dichloride and in butyl acetate, whereas the product before hydrolysis is soluble in all these solvents.

The esters which are hydrolyzed in accordance with the present invention are those that contain more than 25% of acyl groups of more than 16 carbon atoms. These esters when made from cellulose are prepared in an esterification bath in which the proportion of higher acid radicals is greater than that of the lower acid radicals. However, if desired cellulose acetate may be employed as the starting material. The method usually employed for the preparation of these esters is by using an impelling anhydride such as a chloracetic or an alkoxy acetic anhydride. The use of these anhydrides for the preparation of cellulose esters is described in detail in Clarke and Malm Patent No. 1,880,808. The products of the present processes may be employed in any connection where moisture resistant film is desired, particularly where a product containing free hydroxyl groups such as for dye-susceptibility is desired.

As was pointed out in the parent application, it is desirable that the ester be not hydrolyzed below a total acyl content of less than 37%. For the esters which are hydrolyzed, which contain at least 25% of acyl groups of more than sixteen (16) carbon atoms, the higher acyl will constitute at least 50% of the total acyl content of the ester over the hydrolysis range prescribed. Usually these groups will constitute 60% or even more of the total acyl present in the ester.

What we claim as our invention is:

1. A partially hydrolyzed mixed organic acid ester of cellulose having a total acyl content of greater than 37%, of which at least 50% consists of fatty acid radicals containing at least 16 carbon atoms.

2. A partially hydrolyzed mixed organic acid ester of cellulose having a total acyl content of greater than 37%, of which at least 50% consists of stearyl groups.

3. The process of hydrolyzing a mixed organic acid ester of cellulose containing at least 25% of fatty acid groups, of at least 16 carbon atoms which comprises treating it with a hydrolyzing agent and terminating the hydrolysis before the total acyl content of the ester has been reduced to less than 37%.

4. The process of hydrolyzing a mixed organic acid ester of cellulose containing at least 25% of fatty acid groups, of at least 16 carbon atoms which comprises treating it with a hydrolyzing agent, comprising a substantial amount of an organic acid and a small proportion of water, and terminating the hydrolysis before the total acyl content of the ester has been reduced to less than 37%.

CARL J. MALM.
CHARLES L. FLETCHER.